(12) United States Patent
Wong et al.

(10) Patent No.: US 7,058,075 B1
(45) Date of Patent: Jun. 6, 2006

(54) SELF-CONFIGURING INTERFACE FOR COMMUNICATION PROTOCOLS

(75) Inventors: Kenley H. Wong, Saratoga, CA (US); Cherng-Daw Hwang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/334,040

(22) Filed: Jun. 15, 1999

(51) Int. Cl.
*H04L 12/66* (2006.01)
*H04J 3/16* (2006.01)

(52) U.S. Cl. .................. 370/463; 370/466

(58) Field of Classification Search ............ 370/465, 370/466, 472, 470, 467, 463
See application file for complete search history.

(56) References Cited

U.S. PATENT DOCUMENTS

| | | | | |
|---|---|---|---|---|
| 4,792,986 A | * | 12/1988 | Garner et al. | 455/90.2 |
| 5,513,173 A | * | 4/1996 | Machemer et al. | 370/402 |
| 5,617,418 A | * | 4/1997 | Shirani et al. | 370/397 |
| 5,623,491 A | * | 4/1997 | Skoog | 370/401 |
| 6,072,794 A | * | 6/2000 | Kang | 370/352 |
| 6,112,232 A | * | 8/2000 | Shahar et al. | 709/217 |
| 6,122,287 A | * | 9/2000 | Ohanian et al. | 370/465 |
| 6,178,180 B1 | * | 1/2001 | Eng et al. | 340/3.1 |
| 6,222,853 B1 | * | 4/2001 | Marttinen et al. | 340/3.1 |
| 6,250,936 B1 | * | 6/2001 | Armistead et al. | 439/98 |
| 6,510,163 B1 | * | 1/2003 | Won | 370/466 |
| 6,532,240 B1 | * | 3/2003 | Jeong | 370/465 |
| 6,553,117 B1 | * | 4/2003 | Armistead et al. | 379/398 |

FOREIGN PATENT DOCUMENTS

DE 3917482 A1 * 12/1990

OTHER PUBLICATIONS

Chuck Moozakis, *Telcordia Dives Into VoIP*, Updated May 20, 1999, Internet Week.com, at <http://www.internetweek-.com/story/showArticle.jhtml?articleID=6404455>.
*WANs: Divergent Convergence*, p. 2, May 17, 1999 available at <http://www.networkcomputing.com/1010/1010f188.html>.
*Cisco Systems VoIP Gateway Interoperates With MIND CTI VoIP Billing System*, Mar. 23, 1999, available at <http://www.mcnet.com/tmcnet/newsit/it1000163.html>.
*Cisco Systems VoIP Gateway Interoperates With MIND CTI VoIP Billing System*, Mar. 23, 1999, at <http://www.mindcti.com/news_item.asp?id=18>.
*Bad Cisco MICA modems*, May 6, 1999 at <http://newtowrking.smsu.edu/news/Old%20News%20Files/199990506_BadMICA.htm>.

* cited by examiner

*Primary Examiner*—Rick Ngo
*Assistant Examiner*—Soon-Dong Hyun
(74) *Attorney, Agent, or Firm*—Blakely, Sokoloff, Taylor & Zafman LLP

(57) ABSTRACT

An interface for a networking device. A network interface module existing within a networking device monitors certain contacts of a network connection to identify a protocol of the networking system to which it is connected. Based on the detected protocol, the network interface module selects a set of configuration information with which to configure the networking device.

15 Claims, 2 Drawing Sheets

SELF-CONFIGURING INTERFACE FOR COMMUNICATION PROTOCOLS

BACKGROUND (1) Field of the Invention

The invention relates to networking. More specifically, the invention relates to coordination of networking protocols between two networking devices.

(2) Background

Certain communication protocols have been popularized in existing networking systems. In North America, the predominant protocol is T1 which transmits information at 1.544 megabits per second. T1 typically carries DS1 frames which are composed of 24 bytes plus a framing bit in a 125 microsecond frame. T1 provides twenty-four data channels as a trunk interface. The information is contained in the timing of the signals and not their polarity. A T1 transmission uses a bipolar return to zero alternate mark inversion line coding scheme to keep the DC carrier component from saturating the line.

The other predominant communication protocol is E1, referring to the European framing specification. The protocol is widely used in Europe and Asia. E1 conducts transmission of thirty DS0 data streams at a transmission rate of 2.048 megabits per second. E1 has two subprotocols, balanced and unbalanced, which refers to certain characteristics of the transmission line. Issues arise when a network device executing an E1 protocol is connected to a networking device executing a T1 protocol. Such communication is unlikely to result in any valid data transmission. Some existing systems are designed to have internal switches which permit the user to open the box and manually/mechanically switch from an E1 protocol to a T1 protocol, or vice versa. Then based on the switch position, software loads the appropriate configuration information for the protocol selected. However, this involves opening the box with its attendant inconveniences. Repeated opening of the box may result in damage to sensitive internal components, particularly if exposed to dust or other contaminants. Moreover, user selected configuration assumes knowledge by the user which may not be present.

BRIEF SUMMARY OF THE INVENTION

An interface for a networking device is disclosed. A network interface module existing within a networking device monitors certain contacts of a network connection to identify a protocol of the networking system to which it is connected. Based on the detected protocol, the network interface module selects a set of configuration information with which to configure the networking device. Other features and advantages of the present invention will be apparent from the accompanying drawings and detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
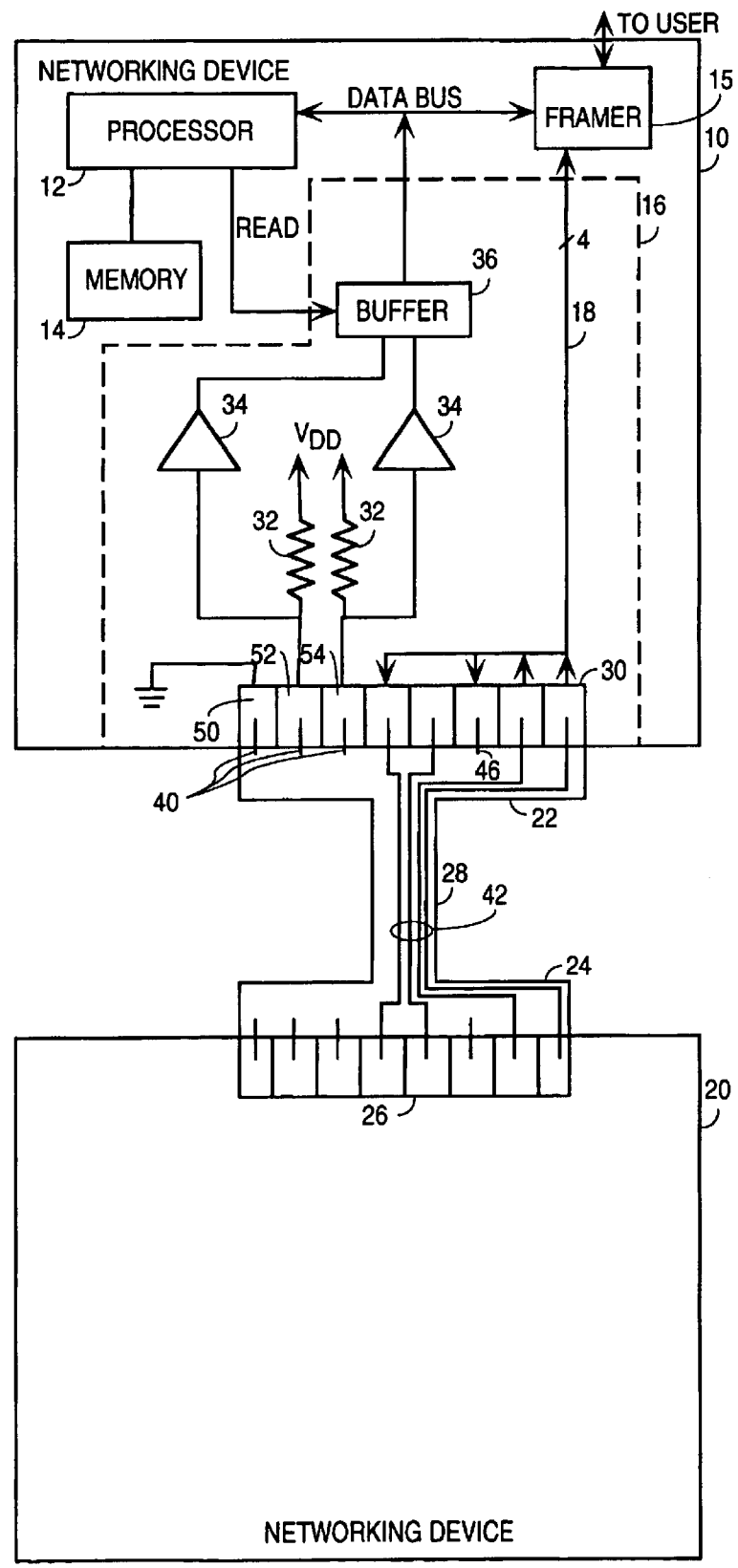
FIG. 1 is a block diagram of a system of one embodiment of the invention.

FIG. 1 is a block diagram of a system of one embodiment of the invention. A first networking device 10 has a processor 12 coupled to a memory 14, the processor 12 controlling operation of the networking device. The processor 12 is coupled to a framer 15. The framer 15 is responsible for placing outgoing data into an appropriate frame structure for the protocol in use. With respect to incoming data, the framer 15 performs decoding and clock recovery functions and distributes the data to a user. The first networking device 10 is coupled by a cable 28 having connectors 22 and 24 at opposing ends to a networking device 20. Connectors 22 and 24 are male connectors that connect to corresponding female connectors 26 and 30 in networking devices 20 and 10, respectively. In an alternative embodiment of the invention the connector of the cable may be female and the connector of the networking device may be male.

For networking devices operating under a T1 or E1 balanced protocol RJ-48, connectors are commonly used. RJ-48 connectors are an industry standard eight pin connectors. E1 unbalanced systems use a BNC connector for coaxial cable. However, T1 and E1 networking cables use only four signal lines 42. Two signal lines are used for transmit and two for receive. This implies that four contacts of an eight pin connector are unused. Here, the plurality of contacts 40 are unused. As used herein, an "unused contact" is a contact in a connector which is not connected to a signal line of a cable when a pair of networking devices are coupled together by the cable.

An interface module 16 is provided in networking device 10 to identify based on the cable connected which protocol networking device 20 is using. Unused contact 50 within networking device 10 is grounded. Similarly, unused contacts 52 and 54 are connected through resistors 32 to a power supply voltage $V_{DD}$. Detectors 34 are coupled between a selection device 36 and contacts 52 and 54. Detectors 34 detect the presence of a voltage at the contacts 52 and 54.

If contacts 52 and 54 are merely terminated inside the connector, the voltage seen by the detectors will be $V_{DD}$. Conversely, if the contacts 52 or 54 are coupled to contact 50 within connector 22, a current will flow through the corresponding resistor 32 and the voltage seen by the detectors 34 will be the ground voltage. Suitable resistance values are on the order of 10K.

The detectors 34 can provide a high or low voltage indication to buffer 36. In this manner, the buffer 36 can be read by the processor 12 and can identify which of a plurality of different sets of configuration information should be used. In one embodiment, the buffer 36 indicates which of T1, E1 balanced, and E1 unbalanced configuration information should be used. The buffer 36 indicates to the processor an appropriate configuration. The processor 12 then configures the framer 15 to operate within the desired protocol. This permits networking device 10 to automatically self-configure based on the cable connected.

Figure 2A:
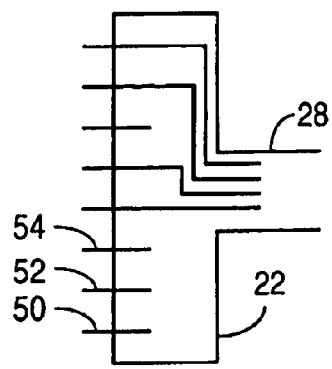
FIGS. 2a–2c show three possible cable connectors which may be used to select between different protocols.
Figure 2B:
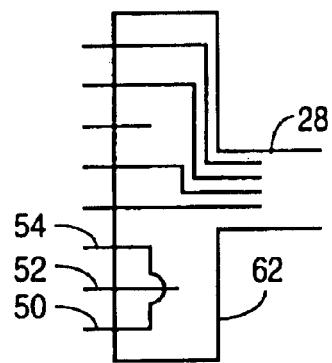
Figure 2C:
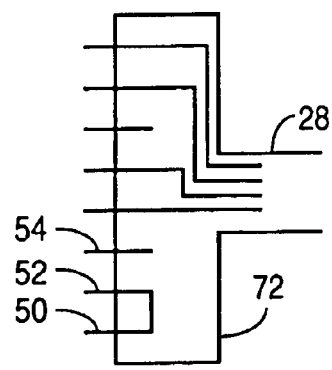

FIGS. 2a–2c show three possible cable connectors which may be used to select between different protocols. Cable connector 22 has no interconnection between any of the unused contacts. Thus, contacts 50, 52, 54 all merely terminate within connector 22. This will result in detection by both detectors 34 of $V_{DD}$.

Connector 62 has contact 54 coupled to contact 50. Contact 52 terminates within connector 62. Thus, the detector 34 coupled to contact 54 will detect ground, while the detector 34 coupled to contact 52 will detect $V_{DD}$. Connector 72 has contact 52 shorted to contact 50, while contact 54 is terminated within connector 72. This will result in a detection of ground by the detector 34 connected to contact 52 and a detection of $V_{DD}$ by the detector 34 coupled to contact 54.

These three connector configurations permit interface module 16 to identify the protocol in use. Thus, the manufacturer, by shipping an appropriate cable with the networking device for the environment to which it will be networked, ensures that the networking device will be properly configured as a result of the cable detection in the interface module.

As noted above, while both T1 and E1 balanced typically use RJ-48 connectors, E1 unbalanced commonly uses BNC connectors. Accordingly, in one embodiment, a generic networking device employing the invention will have an RJ-48 connector, and the cable will provide adaption to BNC at the opposing end when the networking device is to be inserted in an E1 unbalanced system.

The present embodiment permits a generic networking device with three sets of configuration information to be inserted into any of the predominant networking protocols. The only change required is shipment of the appropriate cable. This provides additional benefits because the manufacturer of the networking device need only service and support a single product rather than three separate products, one corresponding to each protocol. Manufacturing costs are also expected to be reduced by having a single generic hardware arrangement that is independent of protocol. Moreover, if the networking device is moved from one system to another, merely a change of cable will automatically accomplish any required reconfiguration without ever opening the box.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a processor;
   a framer controlled by the processor;
   a memory coupled to the processor, the memory storing a first set of configuration information and a second set of configuration information, the first set to configure the framer to communicate across a communication network using a first networking protocol, the second set of configuration information to configure the framer to communicate across a communication network using a second networking protocol; and
   an interface module having a network interface and to detect a voltage at an unused contact to identify a networking protocol for which the apparatus should be configured.

2. The apparatus of claim 1 wherein the interface module comprises:
   a connector to couple the framer to the communication network, the connector having a plurality of contacts, a first contact of the plurality grounded;
   a resistor coupled between a power supply and a second contact of the connector; and
   a detector coupled to the second contact to detect a voltage at the second contact, the detector driving a selection between the first set of configuration information and the second set of configuration information.

3. The apparatus of claim 1 wherein the voltage detected is either a voltage open or a voltage short between two of a plurality of unused contacts.

4. The apparatus of claim 1 wherein the voltage detected is across a resistance of an electronic interconnection between at least two unused contacts.

5. A system comprising:
   a first networking device operating in a first networking protocol;
   a cable having an RJ-48 connector at a first end and a BNC connector at an opposing end, the cable coupled to the first networking device;
   a second networking device coupled to the cable, the second networking device automatically identifying from the cable the first networking protocol and then switching to the first networking protocol.

6. A system comprising:
   a first networking device operating in a first networking protocol;
   a cable coupled to the first networking device;
   a second networking device coupled to the cable, the second networking device automatically identifying from the cable the first networking protocol and driving itself into the first networking protocol; and
   wherein the cable has a connector at each end, the connector having a plurality of unused contacts, and wherein the second networking device has a power supply coupled through a resistor to at least one unused contact when the cable is coupled to the second device.

7. The system of claim 6 wherein the second networking device comprises:
   a network interface module that identifies the cable protocol.

8. The system of claim 6 wherein the second networking device comprises:
   a detector to identify if a voltage at the cable side of the resistor is at a predetermined level.

9. The system of claim 8 wherein the detector signals a software switch which selects a first set of configuration data to configure the device in a first protocol if the voltage is at the predetermined level and selects a second set of configuration data to configure the device in a second protocol if the voltage is not at the predetermined level.

10. An apparatus comprising:
    means for framing a message coupled to a means for controlling the framing;
    means for storing a first set of configuration information to communicate across a communication network using a first networking protocol, and for storing a second set of configuration information to communicate across a communication network using a second networking protocol, the means for storing coupled to the means for controlling the framing;
    means for interfacing with a communication network and detecting a voltage at an unused contact to identify a networking protocol for which the apparatus should be configured.

11. The apparatus of claim 10 further comprising:
    means for providing a selected resistance between a power supply and a contact of the means for coupling; and
    means for detecting a voltage at the contact to drive a selection between the first set of configuration information and the second set of configuration information.

12. A system comprising:

means for communicating over a network using a first networking protocol;

means for connecting the means for communicating to one end of a cable having an RJ-48 connector coupled to a BNC connector, means for automatically identifying from the cable the first networking protocol and then switching to the first networking protocol.

13. A system comprising:

means for communicating over a network using a first networking protocol;

means for communicating over the network using a second networking protocol;

means for coupling communication using the first networking protocol to communication using the second protocol;

means for automatically identifying the first networking protocol from the means for coupling communication by supplying power through a resistor to at least one unused contact of the means for coupling, means for driving the means for communicating over the network using the second networking protocol into the first networking protocol.

14. The system of claim 13 wherein the means for communicating over the network using a second networking protocol includes the means for automatically identifying.

15. The system of claim 13 wherein the means for automatically identifying includes means for identifying if a voltage at the cable side of the resistor is at a predetermined level.

\* \* \* \* \*